Dec. 9, 1930.    H. R. ZEAMANS    1,784,265
CLEAR VISION AUTOMOBILE BODY CONSTRUCTION
Filed July 24, 1926
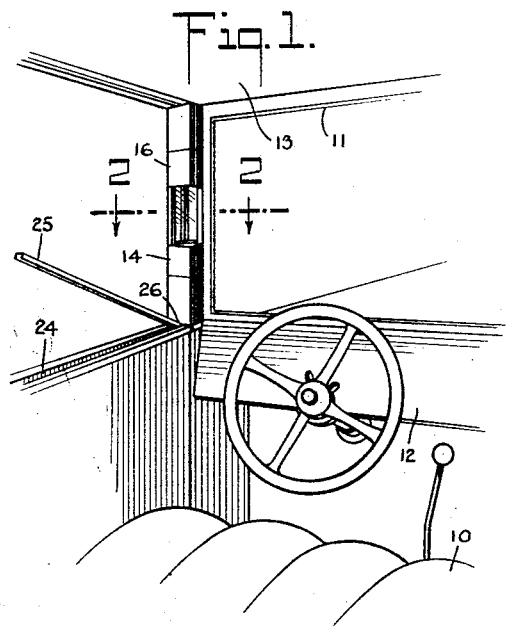
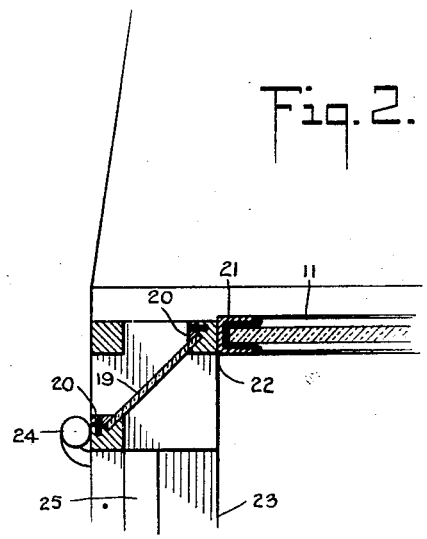
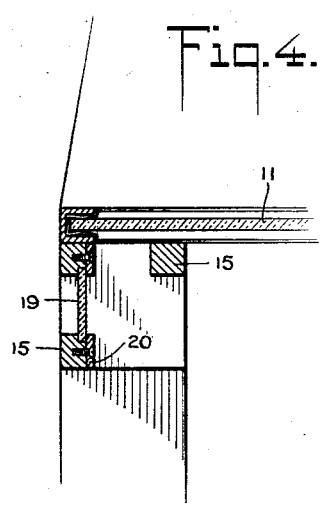
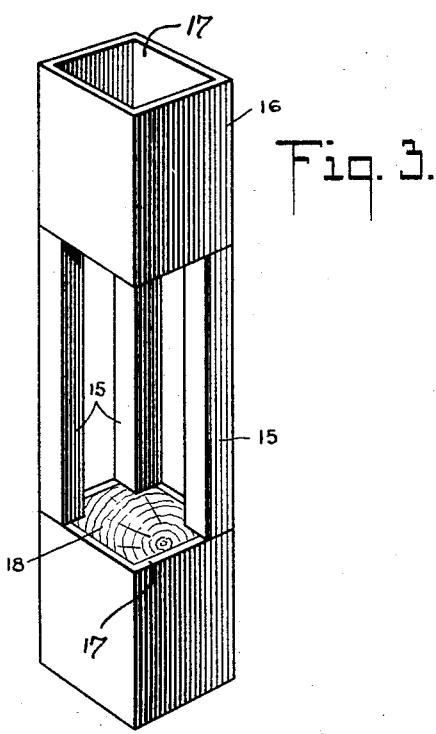
INVENTOR
Harold R. Zeamans
BY
HIS ATTORNEY Patented Dec. 9, 1930

1,784,265

UNITED STATES PATENT OFFICE

HAROLD R. ZEAMANS, OF NEW YORK, N. Y.

CLEAR-VISION AUTOMOBILE BODY CONSTRUCTION

Application filed July 24, 1926. Serial No. 124,730.

This invention relates to vehicle construction such as automobiles and the like, particularly to the closed body variety such as sedans, coupés, coaches, broughams, etc.

My invention generally has application to vehicular construction of the closed body variety involving supports for permanent or semi-permanent tops or roofs to obtain maximum rigidity and strength of construction looking forward to qualities of permanency, beauty, freedom from repair of the body construction, elimination of body noises and vibration of body parts and the support for permanent or semi-permanent tops or roofs of vehicles.

In the construction of vehicles of the closed car variety, such as sedans, coaches, coupés, broughams, omnibuses, etc., having permanent or semi-permanent tops or roofs and with the increase in size and head room of the roof, involving consequent rigidity of support thereof, there have been introduced objectionable factors of vision obscuration due to the increase in size of the supports for the top or roof in proportion to the increase in size of the car roof and head room therefor and the stresses attendant to the support thereof in use to eliminate unnecessary noises due to vibration, body strain, etc. While I have found that with wooden supports or combinations of wood and metal adequate rigidity is obtained, the increase in size of the supports adversely affects the clear view of the driver and serves to present obstructions in the path of view of the driver, limiting the visual angle to a dangerous degree.

Where it has been attempted to increase the visual angle of the body construction by diminishing the size of the top or roof supports by using all metal construction, this has been accompanied by an undesirable amount of body noises due to weaving of the body or vibrations thereof on account of the relative resiliency of the members.

This invention has for an object thereof the provision of vehicular body construction having supports for the tops or roofs thereof having all the rigidity necessary for normal use of the vehicle without the presentation of blind spots, limiting the visual angle of the driver or observer to objects in the path of vision.

The object of my invention still further resides in the provision of vehicular body construction involving members to support the top or roof thereof and suitable for use with wooden bodies, eliminating unnecessary noises due to body vibrations or relative movement of the parts, the supports including beams whose cross sectional area is sufficient to take care of the stresses normally encountered in use and involved in the support of parts of the vehicle, such as the roof, without introducing factors of obstructions or tending to diminish the visual angle of the driver in respect to objects on the roadway in the path of the vehicle.

In its more preferred embodiment, my invention has for an object thereof the provision of a roof support in the form of a beam whose cross sectional area is sufficient to resist the stresses normally encountered in use and which is free from presentation of blind spots and when used with vehicles of the closed body variety will not affect its intended function in the exclusion of air, rain, snow or the like from the interior of the vehicle. More particularly, my invention contemplates the provision of a beam construction for vehicles involving both wood and metal construction whose cross sectional area is effective in withstanding the stresses ordinarily encountered in use and which has parts thereof formed to permit vision therethrough without the presentation of obstructions limiting the visual angle, or the formation of blind spots in the path of the driver in respect to objects on the roadway. Still more particularly, the invention contemplates the provision of a beam construction whose cross sectional area is effective in withstanding stresses normally encountered in use and, which includes clear vision portions to avoid, when used adjacent the driver in the vehicle, the presentation of obstructions to his vision or the formation of blind spots with respect to objects on the roadway.

To attain these objects and such further objects as may appear herein or be hereinafter pointed out, I make reference to the accompanying drawing forming a part hereof in which Figure 1 is a perspective view of the edge of an automobile taken from the driver's seat;

Figure 2 is a section on a line 2—2 of Figure 1;

Figure 3 is an enlarged perspective view of a beam as shown in Figure 1;

Figure 4 is a sectional view similar to Figure 2 of a modification.

Referring to the drawing and particularly to Figure 1, there is shown a corner portion of the automobile 10 taken from the interior of the vehicle and adjacent the driver's seat. The windshield 11 serves to close the front portion thereof between the dashboard and the roof portion 13 (not shown). For support of the roof or top I provide a corner post or edge support 14 which includes at its intermediate portion the construction involving the novel features of my invention in the form of a clear vision assembly comprising a plurality of supports 15, preferably three in number, whose total cross sectional area is such and whose spaced distances are sufficient to effectively resist the bending or torsional stresses encountered at this point.

I have found that the divergence may be greater than that separating the eyes of the human being and that intermediate supports may be included between the most divergent members without the formation of blind spots if the members 15 are so arranged that two of them are never caused to be superimposed in alignment in the path of vision of the driver.

In the construction shown in Figure 3, the beam forming the support shown in Figure 1 may be made of metal of any desired cross sectional area, preferably in the form of a sleeve 16, having a hollow portion 17 and whose total cross sectional area is greater than that designed to resist the stresses normally encountered at this point and necessary for the support of the roof or top of the vehicle. Intermediate the length of the beam, I provide clear vision supports or struts 15 whose individual cross sectional area is such and which are so spaced in respect to each other as to be sufficient to effectively resist the bending, compressive and torsional stresses normally encountered in use. These members 15 may be made integral with the sleeve 16, welded thereto or otherwise rigidly held in position relative to each other.

Where I use the support or beam with a wooden car construction, it is preferred to force a wooden block 18 within the hollow portion 17 of the sleeve member 16. The composite beam so made may be used to supplant the end post or support used in wooden car construction or, if desired, may be made as an accessory to supplant and be inserted in existing wooden vehicles using wooden end posts, as shown in Figure 1.

As a weather protective measure and to exclude air, rain, snow or sleet, it is preferred to insert intermediate the members 15 glass lights or windows 19 held in position by suitable beads 20. In the construction shown in Figure 2 in which the windshield 11 has the framework 21 thereof abutting the inner side of the beam 16, as at 22, it is preferred to position the lights 19 diagonally across the beam and against the most divergent members 15. The window lights 19 and the windshield 11 serve effectively to exclude any draft or any other undesirable ingress of rain, air or the like.

In the modification shown in Figure 4, the windshield 11 may be positioned so as to be in front of the beam 16 and therefore serves to shut off the ingress of air or the like to the interior of the vehicle as between the most adjacent support members 15. In this form of construction, the window light 19 may be positioned between two adjacent supporting members 15.

It will be observed that my support may be used as a corner post as shown in Figure 1, or may form the frame of the door construction adjacent to the driver and which is ordinarily presented in his line of vision. Such door construction may be used in addition to the corner post construction or wherever it is desired to have clear view, avoiding the formation of blind spots due to the size of the beam which would ordinarily be used. In the construction shown by way of illustration, the door 23, hinged to the corner post by the hinge member 24, is of the pocket variety in which the sliding sash is normally retained within the pocket 24 and when not in use is covered by the bead 25 hinged at 26 adapted to be positioned vertically for guiding the sash. By this construction the bead or guide 25, when used as a cover for the pocket of the sash, serves to reduce to a minimum the obscuration caused by the corner post and, when used as a guide in the vertical position, adds very little to the cross sectional area of the beam forming the corner post.

It will thus be observed that I have provided a vehicular construction in which the supports for the top or roof thereof are so formed as to have the cross sectional area necessary to effectively resist the compressive, bending and torsional stresses normally encountered in use without the presentation of blind spots or obstructions to vision of the driver in respect to objects on the roadway in driving or otherwise.

It will be further noted that though I have illustrated my clear vision support as part of the corner post construction and combined with the windshield to form a clear vision weather protection member, it is also contemplated to use my construction with the framework of the doors of the vehicle which are adjacent to, or hinged to the corner post, particularly where the frame of the door would normally serve to increase the size of the obstruction offered by the combined corner post and frame of the door.

It will be further observed that though I have described the members 15 intermediate the beam 16 as simple rectangular bars, ornamental effects may be produced by modification as to the contour of these members as well as the spacing therebetween, to hold ornamentally shaped window lights 19 therebetween.

Having thus described my invention and illustrated its use, what I claim as new and desire to secure by Letters Patent, is—

1. A support of the character described comprising a tubular beam including a plurality of struts intermediate its length spaced relatively to each other and of a size to resist the stresses normally encountered in use, based upon structural materials including wood as a component, the spacing and size of said struts being such as to afford substantially clear vision therethrough.

2. A support of the character described comprising a windshield corner post including within the intermediate length thereof a section comprising rigid members and transparent members, the whole having clear vision therethrough when viewed from spaced points corresponding to the human eyes.

3. A support of the character described comprising a beam including spaced struts and transparent portions intermediate its length, whereby, when used in connection with a vehicle, the beam will permit substantially clear vision therethrough when viewed from spaced points as the eyes of the driver.

4. A support of the character described comprising a beam including a plurality of struts reduced in size intermediate its length, spaced relatively to each other and of a size to resist the stresses normally encountered in use, the spacing and size of said struts being such as to afford substantially clear vision therethrough when viewed from two points corresponding to the eyes of the driver.

5. In a vehicle, in combination with the observer's or driver's portion a support comprising a beam including a plurality of struts intermediate its length spaced relatively to each other and of a size to resist the stresses normally encountered in use, the spacing being such as to afford substantially clear vision therethrough when viewed simultaneously from spaced points as the eyes of the driver, and means associated with said struts to render the vehicle weather proof therethrough.

6. In a vehicle, in combination with the observer's or driver's portion a support comprising a beam whose major cross section would normally produce blind spots including a plurality of struts intermediate its length spaced relatively to each other and of a size to resist the stresses normally encountered in use, the spacing being such as to afford substantially clear vision therethrough when viewed simultaneously from spaced points as the eyes of the driver, and window lights of low-refractive and normal thickness supported intermediate said struts to render the vehicle weather proof.

7. In a vehicle, in combination with the observer's or driver's portion a support comprising a post including a plurality of struts of reduced cross sectional area intermediate its length spaced relatively to each other and of a size to resist jointly the stresses normally encountered in use by the entire post, the spacing being such as to afford substantially clear vision therethrough when viewed from spaced points corresponding to the human eyes, and means associated with said struts, including the windshield thereof, to render the vehicle weather proof therethrough.

8. A device of the character which when used in vehicular construction has a cross sectional area designed to resist the stresses normally encountered in use, and in respect to an observer, such as the driver of the vehicle, comprising a solid beam which has portions whose extreme dimension effectively subtend a substantial part of the visual angle, and means to afford substantially clear vision therethrough when viewed simultaneously by the eyes of the driver, said support comprising intermediate struts acting coordinately as a single beam.

In witness whereof I have hereunto signed my name this 20th day of July 1926.

HAROLD R. ZEAMANS.